United States Patent

Hatfield et al.

[11] Patent Number: 5,954,653
[45] Date of Patent: Sep. 21, 1999

[54] METHOD AND APPARATUS FOR AUTOMATICALLY ENHANCING CONTRAST IN PROJECTED ULTRASOUND IMAGE

[75] Inventors: William Thomas Hatfield, Schenectady; Susan Thayer Mahan, Albany, both of N.Y.

[73] Assignee: General Electric Company, Milwaukee, Wis.

[21] Appl. No.: 08/852,772

[22] Filed: May 7, 1997

[51] Int. Cl.$^6$ ...................................................... A61B 8/00
[52] U.S. Cl. ........................... 600/443; 128/916; 382/274
[58] Field of Search .................................... 600/437, 441, 600/443, 458; 128/916; 382/274, 295–296

[56] References Cited

U.S. PATENT DOCUMENTS

| | | | |
|---|---|---|---|
| 5,226,113 | 7/1993 | Cline et al. | 395/124 |
| 5,365,929 | 11/1994 | Peterson | 128/661.1 |
| 5,456,255 | 10/1995 | Abe et al. | 600/441 |
| 5,469,849 | 11/1995 | Sasohi et al. | 600/458 X |
| 5,474,073 | 12/1995 | Schwartz et al. | 128/661.1 |
| 5,485,842 | 1/1996 | Quistgaard | 128/660.07 |
| 5,529,070 | 6/1996 | Augustine et al. | 128/916 X |
| 5,582,173 | 12/1996 | Li | 128/660.07 |
| 5,615,679 | 4/1997 | Ri et al. | 600/437 |
| 5,655,535 | 8/1997 | Friemel et al. | 128/660.07 |
| 5,682,895 | 11/1997 | Ishiguro et al. | 128/916 |
| 5,706,816 | 1/1998 | Mochizuki et al. | 128/916 X |

FOREIGN PATENT DOCUMENTS

WO 97/00482  1/1997  WIPO.

*Primary Examiner*—Francis J. Jaworski
*Attorney, Agent, or Firm*—Dennis M. Flaherty; John H. Pilarski

[57] ABSTRACT

A method and an apparatus for automatically adjusting the contrast of a projected ultrasound image. An ultrasound scanner collects B-mode images in a cine memory, i.e., for a multiplicity of slices. The data from a respective region of interest for each slice is sent to a master controller, such data forming a volume of interest. The master controller performs an algorithm that iteratively projects the pixel intensity data in the volume of interest onto a plurality of rotated image planes using a ray-casting technique. Before the projected images are stored in cine memory, the contrast of the pixel intensity data making up those projected images is adjusted by the master controller using a one-to-one mapping of unadjusted pixel intensity data into adjusted pixel intensity data. The mapping is generated by the master controller based on the pixel intensity data of either a source frame or a projected image. The contrast adjustment mapping is applied to each projected image.

20 Claims, 8 Drawing Sheets

METHOD AND APPARATUS FOR AUTOMATICALLY ENHANCING CONTRAST IN PROJECTED ULTRASOUND IMAGE

FIELD OF THE INVENTION

This invention generally relates to ultrasound imaging of the human anatomy for the purpose of medical diagnosis. In particular, the invention relates to a method for imaging the human anatomy by detecting the intensity of ultrasonic echoes reflected by a scanned volume in a human body.

BACKGROUND OF THE INVENTION

The most common modes of diagnostic ultrasound imaging include B- and M-modes (used to image internal, physical structure), Doppler, and color flow (the latter two primarily used to image flow characteristics, such as in blood vessels). In conventional B-mode imaging, ultrasound scanners create images in which the brightness of a pixel is based on the intensity of the echo return. The amplitude of the reflected waves is employed to produce black and white images of the tissues.

The present invention is incorporated in an ultrasound imaging system consisting of four main subsystems: a beamformer 2 (see FIG. 1), processor subsystem 4, a scan converter/display controller 6 and a master controller 8. System control is centered in master controller 8, which accepts operator inputs through an operator interface (not shown) and in turn controls the various subsystems. The master controller also generates the system timing and control signals which are distributed via a system control bus 10 and a scan control bus (not shown).

The main data path begins with the digitized RF inputs to the beamformer from the transducer. The beamformer outputs two summed digital baseband receive beams. The baseband data is input to B-mode processor 4A and color flow processor 4B, where it is processed according to the acquisition mode and output as processed acoustic vector (beam) data to the scan converter/display controller 6. The scan converter/display controller 6 accepts the processed acoustic data and outputs the video display signals for the image in a raster scan format to a color monitor 12. The scan converter/display controller 6, in cooperation with master controller 8, also formats multiple images for display, display annotation, graphics overlays and replay of cine loops and recorded timeline data.

The B-mode processor 4A converts the baseband data from the beamformer into a log-compressed version of the signal envelope. The B function images the time-varying amplitude of the envelope of the signal as a grey scale using an 8-bit output for each pixel. The envelope of a baseband signal is the magnitude of the vector which the baseband data represent.

The frequency of sound waves reflecting from the inside of blood vessels, heart cavities, etc. is shifted in proportion to the velocity of the blood cells: positively shifted for cells moving towards the transducer and negatively for those moving away. The color flow (CF) processor 4B is used to provide a real-time two-dimensional image of blood velocity in the imaging plane.

The acoustic line memories 14A and 14B of the scan converter/display controller 6 respectively accept processed digital data from processors 4A and 4B and perform the coordinate transformation of the color flow and B-mode data from polar coordinate (R-θ) sector format or Cartesian coordinate linear array to appropriately scaled Cartesian coordinate display pixel data stored in X-Y display memory 18. In the B-mode, intensity data is stored in X-Y display memory 18, each address storing three 8-bit pixels. Alternatively, in the color flow mode, color flow data is stored in memory as follows: intensity data (8 bits), velocity or power data (8 bits) and turbulence data (4 bits).

A multiplicity of successive frames of color flow or B-mode data are stored in cine memory on a first-in, first-out basis. The cine memory is like a circular image buffer that runs in the background, continually capturing image data that is displayed in real time to the user. When the user freezes the system, the user has the capability to view image data previously captured in cine memory. The graphics data for producing graphics overlays on the displayed image is generated and stored in the timeline/graphics processor and display memory 20. The video processor 22 multiplexes between the graphics data, image data, and timeline data to generate the final video output in a raster scan format on video monitor 12. Additionally it provides for various greyscale and color maps as well as combining the greyscale and color images.

The conventional ultrasound imaging system collects B-mode or color flow mode images in cine memory 24 on a continuous basis. The cine memory 24 provides resident digital image storage for single image review and multiple image loop review and various control functions. The region of interest displayed during single-image cine replay is that used during the image's acquisition. The cine memory also acts as a buffer for transfer of images to digital archival devices via the master controller 8.

Conventional ultrasound scanners create two-dimensional B-mode images in which the brightness of a pixel is based on the intensity of the echo return. Two-dimensional ultrasound images are often hard to interpret due to the inability of the observer to visualize the two-dimensional representation of the anatomy being scanned. However, if the ultrasound probe is swept over an area of interest and two-dimensional images are accumulated to form a three-dimensional volume, the anatomy becomes much easier to visualize for both the trained and untrained observer. Typically, three-dimensional images of B-mode data and color flow velocity or power data are displayed separately. However, there are many occasions when, by displaying velocity or power data alone, the viewer loses a sense of the anatomy being imaged. By combining intensity projections with projections of color flow velocity or power data, it is possible to retain a sense of the anatomy and at the same time image the velocity or power.

To achieve the best image quality when performing three-dimensional reconstructions of ultrasound images, it is necessary to adjust the contrast of the reconstructed image due to the large variation in the contrast of ultrasound images. This is typically done by allowing the user to interactively set the image contrast and brightness of the image. This method is time consuming and requires user input not normally provided on ultrasound imagers. In addition, the brightness and contrast of the rendered image may vary considerably from the source images used to construct the three-dimensional projection. If the original and rendered images are viewed simultaneously by the same display processor, it may not be possible to achieve acceptable brightness and contrast levels for both images.

SUMMARY OF THE INVENTION

The present invention is a method for automatically adjusting the contrast in three-dimensional ultrasound images to achieve optimum contrast. This is achieved by automatically adjusting the brightness and contrast levels of the reconstructed image, based on the levels of the reconstructed or source images, to achieve the optimum levels for the reconstructed image. This technique allows both the source and reconstructed images to be displayed in the same brightness and contrast ranges.

The invention is employed in an ultrasound imaging system which collects B-mode images in a cine memory on a continuous basis or in response to an external trigger event, i.e., for a multiplicity of slices. The data from a respective region of interest for each slice or source image is sent to a master controller, such data forming a volume of interest. The master controller performs an algorithm that iteratively projects the pixel intensity data in the volume of interest onto a plurality of rotated image planes using a ray-casting technique. The projected images are ultimately stored as separate frames in the cine memory, each frame being superimposed on the last background frame. These reconstructed frames are then displayed selectively by the system operator. However, before the projected images are stored in cine memory, the contrast of the pixel intensity data making up those projected images is adjusted.

In accordance with the present invention, the contrast of the projected images is adjusted by the master controller by creating a one-to-one mapping of unadjusted pixel intensity data into adjusted pixel intensity data. The mapping is generated based on the pixel intensity data of either a source frame or a projected image. In the former case, the mapping is generated before projection; in the latter case, the mapping is generated after projection. The mapping is applied to each projected image to provide contrast adjustment for display.

To generate the contrast adjustment mapping, the master controller compiles a histogram of the number of pixels having an intensity within each of a multiplicity of prescribed intensity ranges or bins for one or more slices of source data or for one or more projected images (e.g., the 0° projection). At the same time, the master controller determines the maximum pixel intensity in the source or projected image. Starting with the bin including the maximum number of pixels and then adding the remaining bins in the order of decreasing number of pixels, the number of pixels in each intensity range or bin are added up until a predetermined percentage of the total number of pixels is reached. When the counted bins include mostly relatively high-intensity pixels, the lower limit of the lowest intensity bin included in the count becomes the pixel intensity threshold. Conversely, when the counted bins include mostly relatively low-intensity pixels, the upper limit of the highest intensity bin included in the count becomes the pixel intensity threshold. In either case, a one-to-one mapping is then created such that the range of intensity values above (or below) the pixel intensity threshold is linearly correlated to an expanded display intensity value range from 0 to 255.

In accordance with the method of the invention, the contrast of each projected image is automatically adjusted, using the mapping generated from the pixel intensity histogram, before the master controller writes that projected image into the cine memory. More specifically, the projected pixel data having intensity values within the range corresponding to the bins included in the histogram count, i.e., within the map input range, is contrast adjusted by transforming each intensity value in the projected pixel data into the corresponding display intensity value established by the one-to-one mapping. The pixel data having intensity values outside the map input range is discarded. By thus increasing the contrast of the pixel intensity data of greatest interest and discarding the pixel intensity data of least interest, each projected image is mapped to the desired brightness and contrast range above or below the pixel threshold depending on the intended result.

DETAILED DESCRIPTION OF THE PREFERRED EMBODIMENTS

Figure 1:
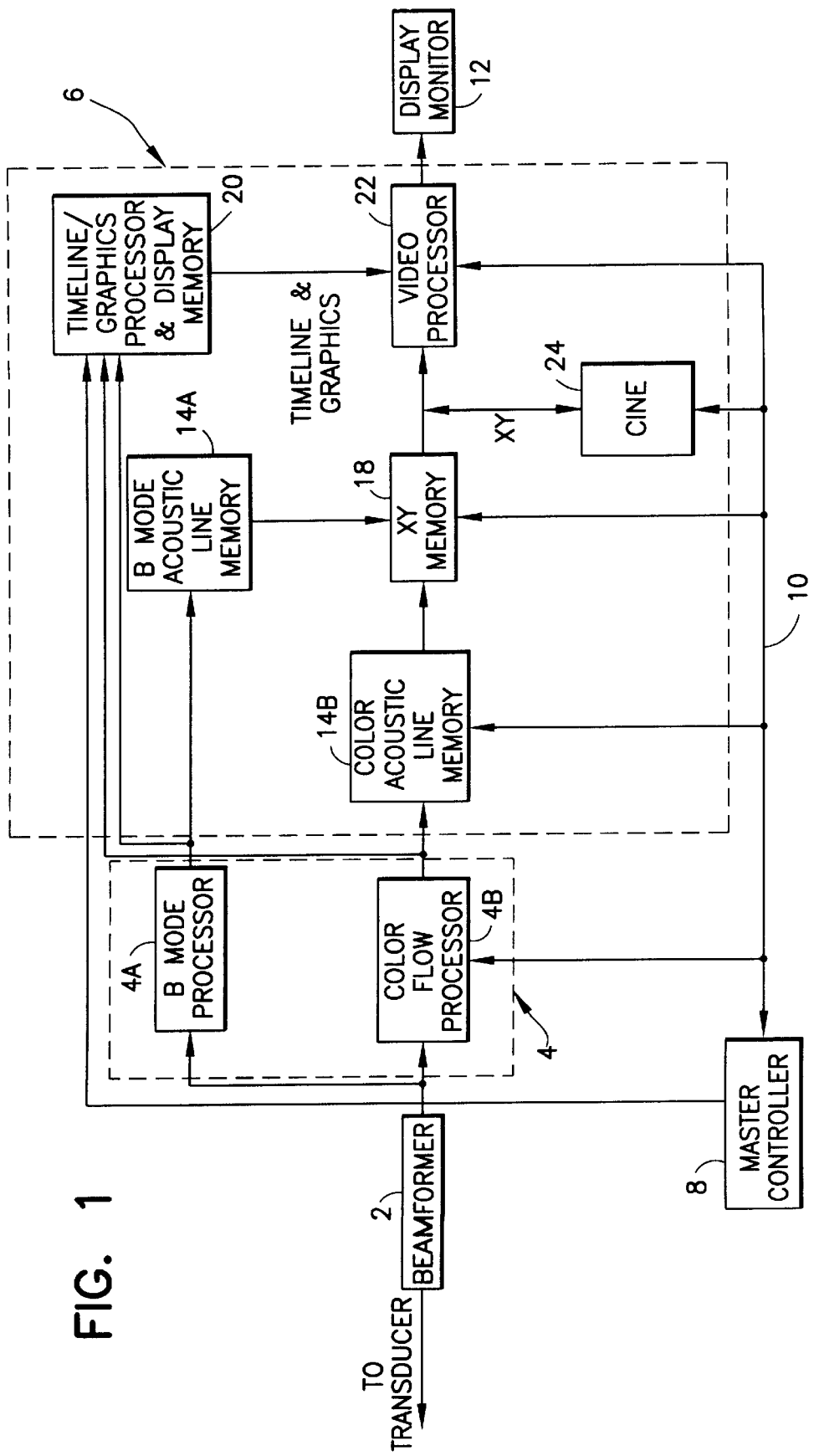
FIG. 1 is a block diagram showing the major functional subsystems within a real-time ultrasound imaging system.
Figure 2:
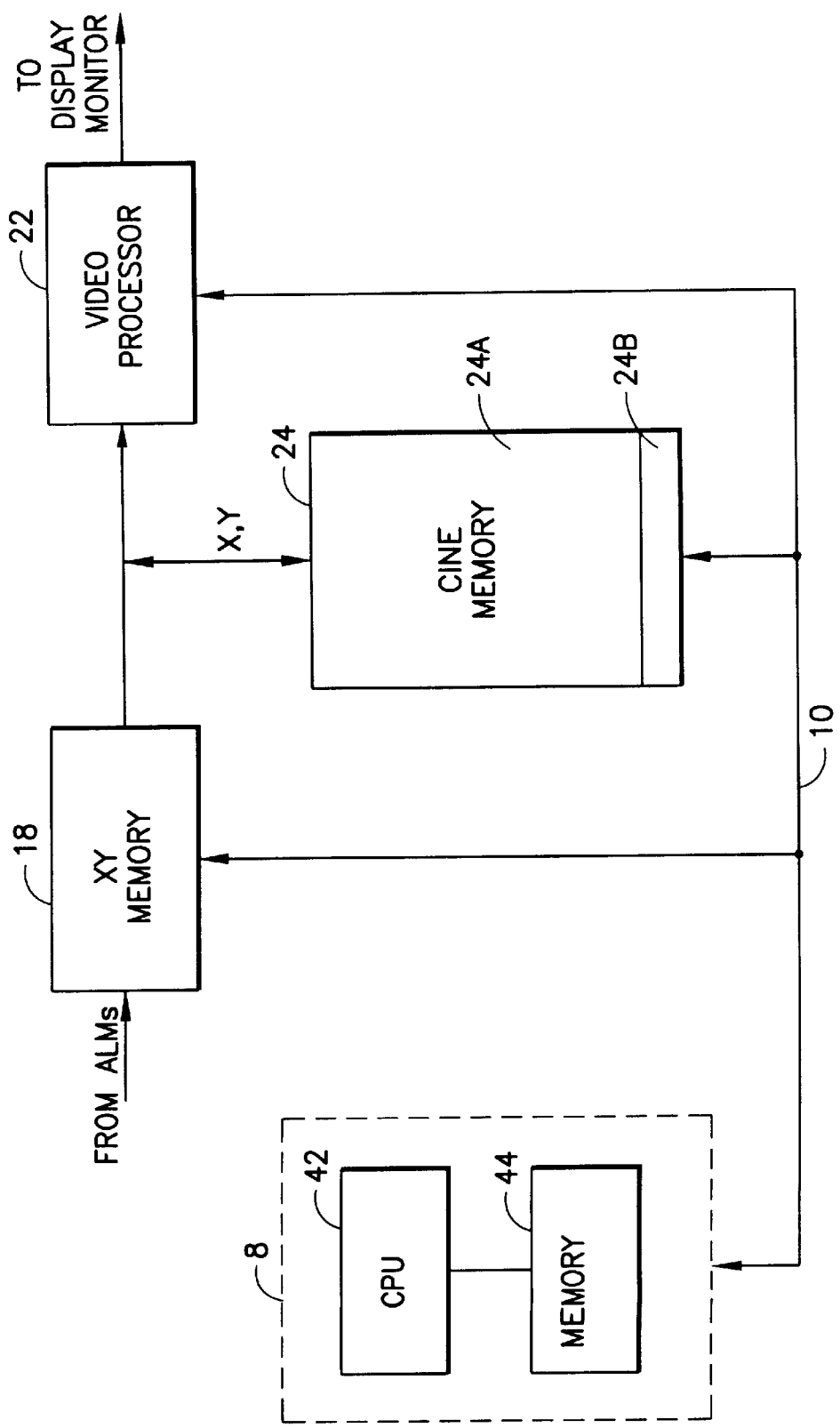
FIG. 2 is a block diagram showing the means for reconstructing frames comprising successive volumetric projections of intensity and velocity or power pixel data in accordance with a preferred embodiment of the present invention.

Referring to FIG. 2, the master controller 8 comprises a central processing unit (CPU) 42 and a random access memory 44. The CPU 42 has read only memory incorporated therein for storing routines used in transforming the acquired volume of intensity or color flow mode data into a multiplicity of three-dimensional projection images taken at different angles. The CPU 42 controls the XY memory 18 and the cine memory 24 via the system control bus 10. In particular, the CPU 42 controls the flow of pixel data from the XY memory 18 to the video processor 22 and to the cine memory 24, and from the cine memory to the video processor 22 and to the CPU 42 itself. When the ultrasound imaging system is operating in the color flow mode, each frame of color flow data, representing one of a multiplicity of parallel scans or slices through the object being examined, is stored in the XY memory 18 and in the next cycle is transmitted to video processor 22 and to cine memory 24. A stack of frames, representing the scanned object volume, is stored in section 24A of cine memory 24. During initialization (see step 26 in FIG. 3), the CPU 42 retrieves from cine memory section 24A only the color flow data corresponding to an object volume of interest. This is accomplished by retrieving only the color flow data in a region of interest from each stored frame acquired from any scan which intersected the object volume of interest. In other words, the color flow data corresponding to the region of interest from each one of a stack of successive frames forms a source data volume of interest.

Figure 3:
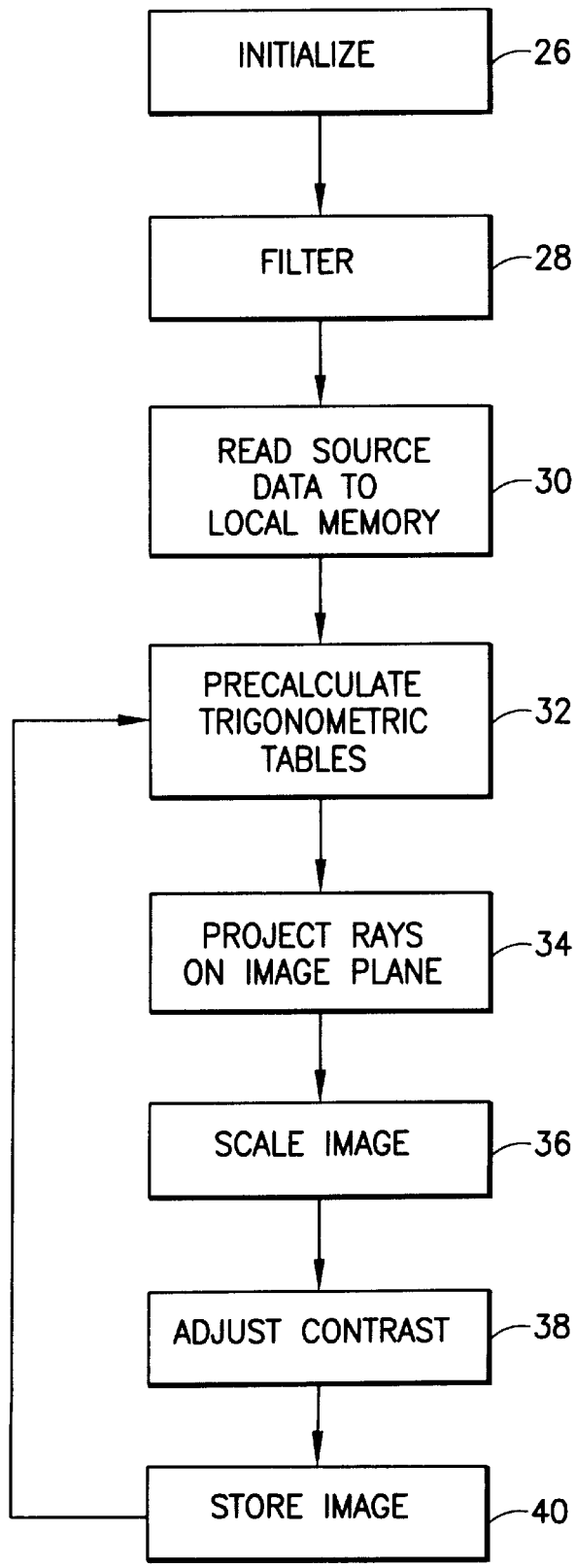
FIG. 3 is a flowchart showing the steps of an algorithm for reconstructing frames comprising successive volumetric projections of intensity and velocity or power pixel data in accordance with the preferred embodiment of the present invention.

As seen in FIG. 3, the intensity data in the pixel data set corresponding to the object volume of interest is optionally filtered (step 28) prior to projection in order to smooth speckle noise and reduce artifacts. This prevents the loss of data due to speckle noise during projection. For example, blood vessels are less echogenic than the surrounding tissue. Therefore vessels can be imaged using minimum intensity projections. Alternatively, in the reverse video/minimum mode, the intensity data is inverted to make the vessels bright instead of dark. The vessels can then be imaged using maximum intensity projections. To prevent the selection of maximum intensities which are bright speckle as opposed to desired pixel data, a filter can be used to remove such bright speckle intensities prior to projection. The source data volume retrieved from the cine memory 24 (see FIG. 2) may be filtered by CPU 42 using, e.g., a 3×3 convolution filter having a 111 141 111 kernel, i.e., the central pixel of intensity data in each 3×3 pixel array in each slice or frame is replaced by an intensity value proportional to the sum of four times the value of the central pixel plus the sum of the values of the eight pixels surrounding that pixel. The filtered source data volume is then stored in memory 44 (step 30). In a similar manner, a convolution filter can be used to remove black holes in an image prior to minimum intensity projection.

Next the CPU 42 performs a series of transformations using the ray casting algorithm disclosed in U.S. Pat. No. 5,226,113. The successive transformations represent maximum, minimum or averaged intensity, velocity or power projections made at angular increments, e.g., at 10° intervals, within a range of angles, e.g., +90° to −90°. However, the angular increment need not be 10°; nor is the invention limited to any particular range of angles.

Figure 4:
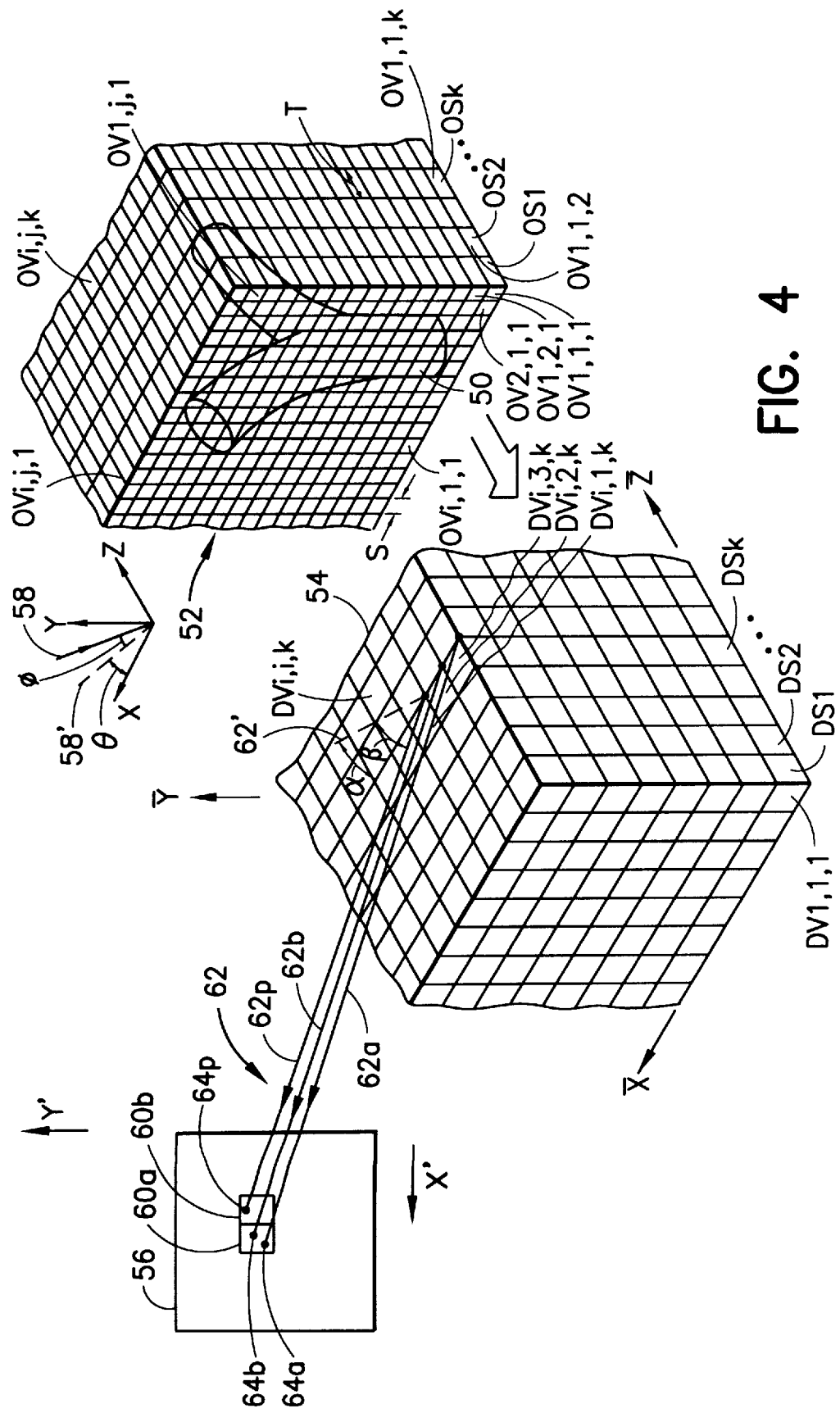
FIG. 4 is a schematic of the sampled object volume of interest, an associated data volume and an image projection plane involved in volumetrically rendering a reversed ray-cast projection in accordance with the prior art.

In accordance with the ray casting technique employed in the present invention, volumetrically rendered projection images of a sample 50 (see FIG. 4) is displayed from any arbitrary viewing angle, e.g. a spherical projection angle denoted by angle parameters $(\theta,\phi)$, where $\theta$ is the angle that an extension 58' of a viewing ray 58 makes upon the X-Y plane, and $\phi$ is the angle of ray 58 with respect to extension 58', by scanning an object volume 52 an ultrasound transducer. Sample volume 52 is scanned in such a manner as to create a series of stacked, contiguous slices or sheets $OS_1$, $OS_2$, ..., $OS_k$, each of which contains the same number of object volume elements (voxels) OV. Each voxel has a rectangular profile in the sheet plane (say, the X-Y plane); while the complementary sides may be of equal length S, so that this profile may be square, the sheet thickness T is generally greater than the length of either side. Thus, the first object slice $OS_1$, contains a first multiplicity of object voxels $OV_{i,j,1}$, where i and j are the respective X-axis and Y-axis positions of the voxel. Similarly, the second object slice $OS_2$ contains object voxels $OV_{i,j,2}$. An arbitrary object slice $OS_k$ contains voxels $OV_{i,j,k}$, where k is the Z-axis position of that voxel.

Each object voxel $OV_{i,j,k}$ is analyzed and the data value (intensity, velocity or power) thereof is placed in a corresponding data voxel $DV_{i,j,k}$ of a data volume 54. Data volume 54 is a simple cubic i,j,k lattice, even though the thickness of each object slice $OS_k$ and each object voxel face size (the size of the voxel in the X-Y plane) will generally not be the same. That is, not only may the object volume have different X, Y and Z dimensions for each voxel, but also the total number of voxels in any dimension need not be the same. For example, a typical ultrasound three-dimensional scan may provide each slice with a 256×256 matrix of voxels, and may involve 128 slices.

In accordance with a known technique employed by CPU 42, an image of object 50 is projected (step 34 in FIG. 3) by ray casting toward the image plane 56 from a lattice point in data voxel $DV_{i,j,k}$. For convenience, the lattice point may, for example, be the data voxel vertex closest to the data volume origin. The cast ray 17 leaves the data volume 54 at a projection angle with spherical angular parameters $(\alpha,\beta)$ transformed from the spherical angular parameters $(\theta,\phi)$ at which the object volume 52 is viewed. These two angles are not the same, due to the geometric distortion caused by use of a cubic data volume 54 with a non-cubic object volume 52. However, the projected ray 17 has an $\overline{X}$-$\overline{Y}$ plane extension 17' which makes an angle $\alpha$ with respect to the $\overline{x}$ axis of the data volume, and ray 17 makes an angle $\beta$ with the Z axis. Thus, angles $\alpha$ and $\beta$ are determined by a rotation process (to be discussed hereinbelow) to correspond to viewing the object volume 52 at the desired viewing angle $(\theta,\phi)$ (assuming operation in spherical coordinates). Each of the rays 17 is cast from the data volume voxel lattice point toward the image plane.

While all rays 17 impinge upon some portion of the image plane, only those rays falling within the image plane pixel 60a under consideration are allowed to contribute to the data for that image plane pixel. Thus, having chosen a portion of the object volume 52 to view and a viewing angle $(\theta,\phi)$ at which to view this selected object volume, the data value in each voxel of the corresponding portion of the data volume is cast at some angle $(\alpha,\beta)$ (corresponding to viewing the distorted data volume with respect to the object volume) toward the image plane 56. The data value in a first voxel (say, voxel $DV_{I,j,k}$) is thus back-projected along ray 17a, in accordance with the $\theta$ and $\phi$ values chosen. This ray 17a impinges upon image plane 56 at a position 64a within pixel 60a, and, as this is the first ray to impinge upon this pixel, the intensity, velocity or power value of the incident data is attributed to (stored in) the desired pixel 60a. The next voxel in the data volume (say voxel $DV_{i,2,k}$) has its associated ray 17b projected at the same angular $(\alpha,\beta)$ configuration from the voxel lattice point, and its position 64b upon image plane 56 is noted. Assuming that impingement position 64b is within desired pixel 60a, the second projected value is (for a maximum pixel projection) compared with the now stored first value and the larger value is placed in storage for pixel 60a. It will be understood that, for an averaged-value projection, the value of a current projected data voxel is added to the sum already stored for the image panel pixel upon which that projection ray impinges, and the sum is eventually divided by a counted number of such impinging rays for that pixel. As each voxel in the selected data volume is sequentially entered and projected toward image plane 56, a data volume voxel (say, voxel $DV_{i,3,k}$) is eventually projected along its associated ray 17p and does not impinge within the desired pixel 60a, so that its data value (e.g., intensity) is not compared to the data value presently stored for pixel 60a. The maximum data value for pixel 60a is now established, for that projection of the data at the particular $(\theta,\phi)$ three-dimensional angle of view. However, the ray 17p does, in fact, have an impingement point 64p which falls within another image plane pixel (say, pixel 60b) and is compared to the data value stored therein and the larger value is, after the comparison, returned to storage for that pixel. All data values are reset to zero when a new projection is to be taken. Thus, each of the image plane pixels is reset at the start of an image projection procedure, and all of the data volume voxels (in the entire space or in the selected portion, as set by the portion of the object volume 52 selected) are individually and sequentially scanned. The data value in each data voxel DV is projected through an associated ray 17 to impinge upon image plane 56 in one pixel 60 thereof, with the maximum value in each pixel being compared between the present value of the ray-casted data volume voxel, to determine the larger thereof, which larger value is then stored as part of the maximum value image. In practice, for a maximum pixel projection, the stored maximum value will be changed only if the newly cast data voxel value is greater than the data value already stored for the image plane pixel upon which the newly cast ray impinges.

Figure 5:
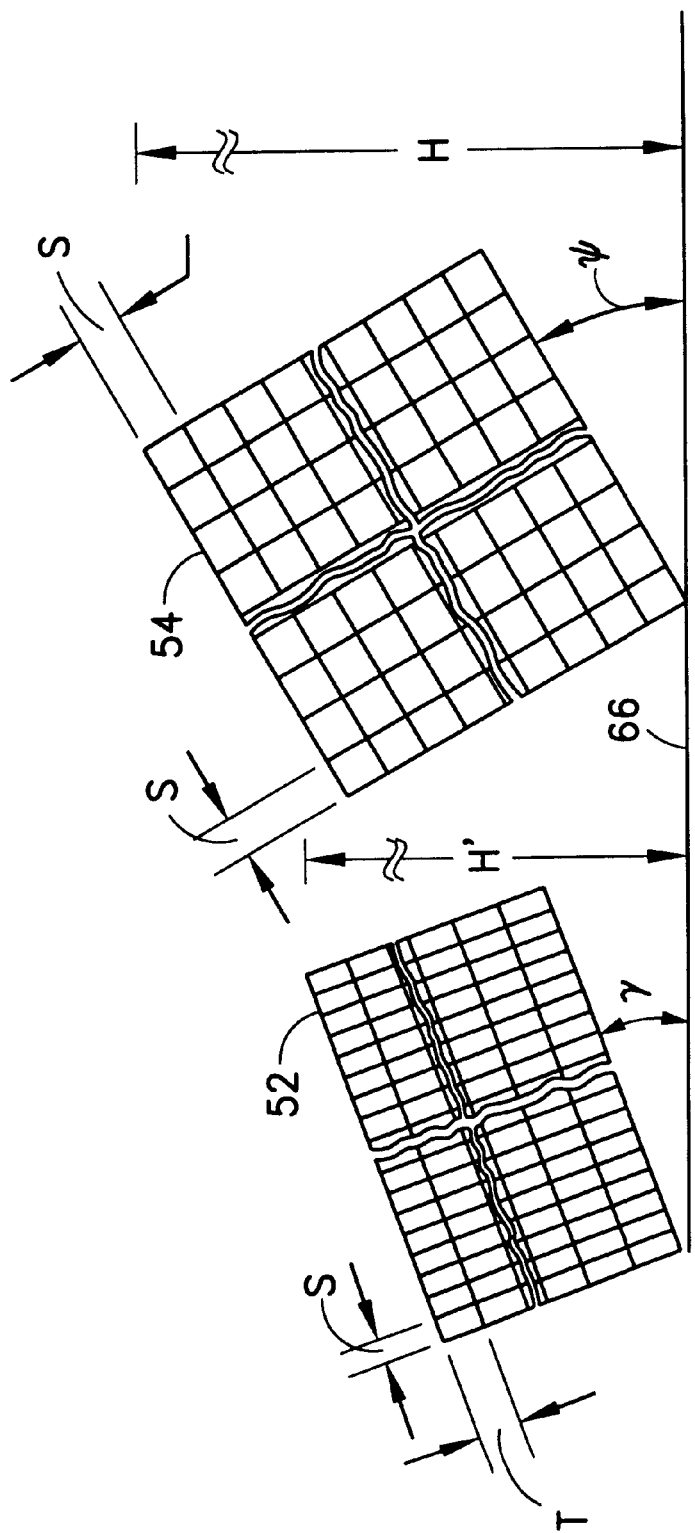
FIG. 5 is a schematic showing a pair of geometric two-dimensional configurations corresponding to like views of object and data volumes, and useful in defining necessary scaling constants in three-dimensional ultra-sound imaging.

In accordance with another aspect of the foregoing technique, the data projection is scaled (step 36 in FIG. 3) and any anisotropy between the object volume and the image plane is removed by only a single set of calculations after back projection is complete. Referring now to FIG. 5, because object volume 52 is a real volume while data volume 54 is an abstract concept, it is necessary to determine the amount of distortion of the data projection due to the presentation of the cubic data volume lattice 54 at a different angle γ, in a first plane, then the angle ψ at which an arbitrary viewing direction 66 will be positioned with respect to both the object volume 52 and data volume 54. The apparent dimensions of each voxel are going to change as the effective elevation angles ψ and γ change. If the aspect ratio A (defined as the ratio of the actual slice thickness T in object volume 52 to the actual pixel size S in the same object volume 52) is not unity (i.e., is greater or less than unity, as the object voxel is not a cubic voxel, as will be encountered in data volume 54), then the angles ψ and γ of elevation will be different, and the effective elevation angle ψ in the data volume will be different than the actual elevation angle γ in the object volume. Rotation of the data is in accordance with an object elevation angle obtained by:

$$\psi = \tan^{-1}\left(\frac{1}{A}\tan[\lambda]\right)$$

Thereafter, the projected data can be scaled to have the correct height (if rotation is about the horizontal axis) in the object volume, by multiplication of all projected data heights by the elevation scale factor. The old projected image height H can be corrected with an effective scale factor $E_s$, where $$E_s = \sqrt{(A\cos\gamma)^2 + \sin^2\gamma}$$

and the new height H'=H·$E_s$. The same is true for the width when rotation is about the vertical axis.

Utilizing the above relationship, the rotation of data volume angles (α,β) becomes angles (θ,φ), because the distortion is only along one axis, so that angle θ equals angle α. The elements of the 3×3 rotational matrix [M] can be determined, and given the two involved rotational angles, these relationships are used to determine the data volume-to-image plane transformations:

$$X'=M1X+M2Y+M3Z+XO$$

$$Y'=M4X+M5Y+M6Z+YO$$

where M1–M6 are the first two rows of the rotational matrix (i.e., M1=–sin θ, M2=cos θ sin ψ, M3=0, M4=–Cos θ sin ψ2, M5=–sin θ sin ψ, and M6=cos ψ), X' and Y' are the locations on the image plane of the projected point, and XO and YO are image plane X and Y offsets (respectively referenced to the X and Y lowest value points) at which the selected portion of the image plane begins. After the data is projected onto image plane 56, the image is scaled to correct for the effect of the anisotropic object voxels. It will be seen that factors M1–M6 can be precalculated (step 32 in FIG. 3) at the beginning of a projection (given θ and ψ) and used for all rotation calculations.

Figure 6:
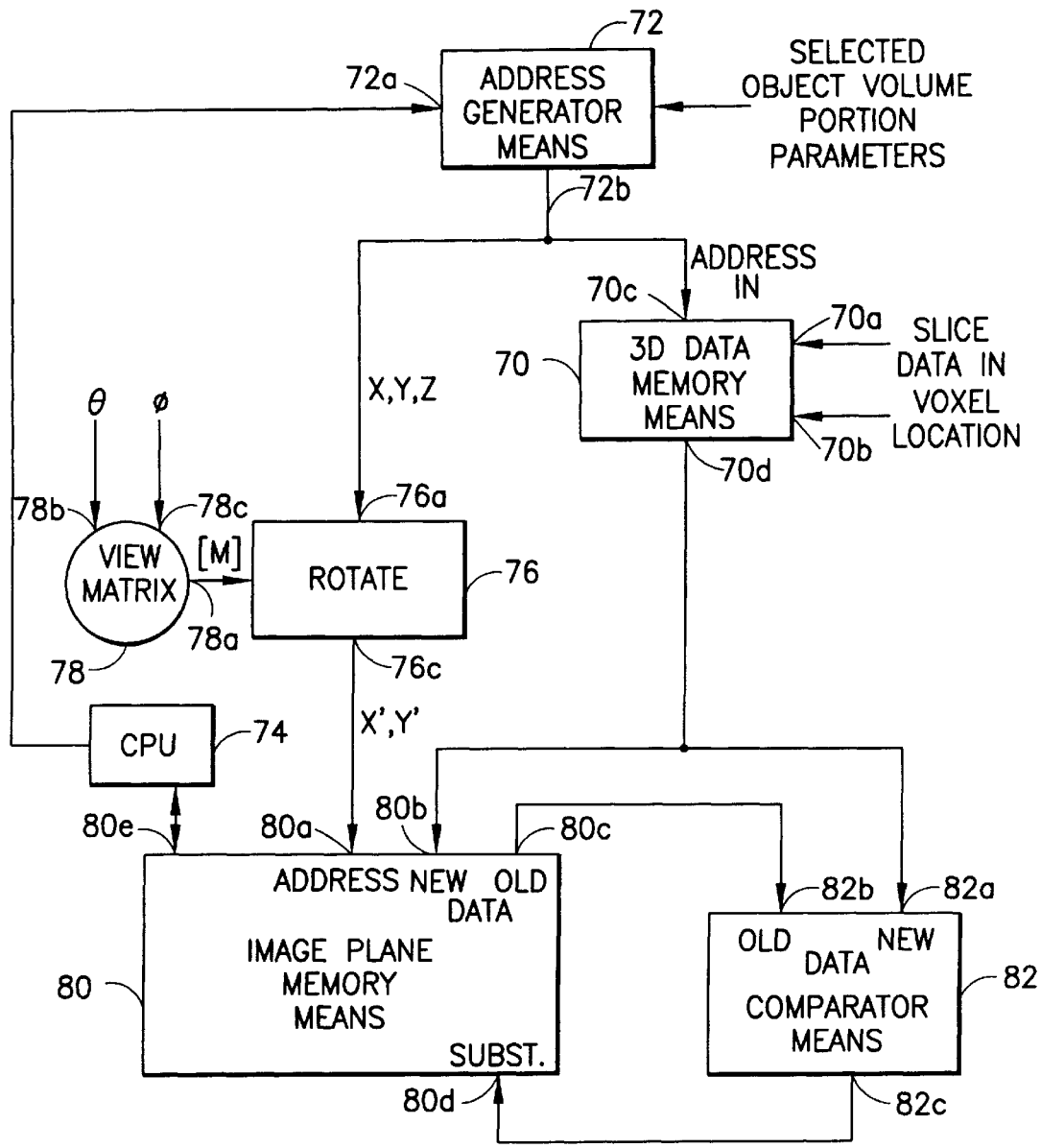
FIG. 6 is a schematic block diagram of means for providing a maximum intensity projection in three-dimensional ultrasound imaging.

FIG. 6 shows means for performing the above-described ray-casting technique which are incorporated in the master controller 8 (or a separate dedicated processor). Such means comprise a three-dimensional data memory means 70 for storing slice data as received at a data input 70a from cine memory 24. The data associated with each object voxel is stored at the address of that voxel, responsive to voxel address input information received at a voxel address input 70b from a CPU 74. Once the data memory means is filled (corresponding to the transfer of all required data from object volume 52 to data volume 54), the object volume portion of interest is selected and data establishing its starting corner and extent in the X, Y and Z directions is sent from CPU 74 to an input 72a of an address generator means 72. Means 72 sequentially provides, at an address output 72b, the X,Y,Z addresses of each voxel within the object volume selected. Output 72b is connected to an output-data-address input 70c of data memory means 70, causing the stored intensity data for that one voxel then addressed to be output from data memory means output 70d. The sequence of voxel X,Y,Z addresses is also provided to a first input 76a of a rotational parameter calculation means 76, which receives angle (α,β) information via CPU 74 as the calculated matrix element M1–M6 values, to provide at an output 76c the address X',Y' of the image plane pixel corresponding to that object X,Y,Z pixel when viewed at a selected viewing angle (θ,φ). The viewing angle (θ,φ) information is entered into the system and processed by CPU 74. The results are entered into inputs 78b and 78c of a viewing matrix means 78, to provide matrix elements M1–M6 at its output 78a and thence to rotational parameter calculation means 76. The image plane pixel address X',Y' appears at an address input 80a of a frame buffer acting as an image plane memory means 80. Simultaneously, the intensity data, projected from the data volume to the projection plane, appears at the image plane memory means new data input 80b, from three-dimensional data memory means output 70d. This data also appears at the new data input 82a of a data comparator means 82. Intensity data previously saved in the image plane memory means 80 for that address, at input 80a, appears at an old data output 80c, and thence at an old data input 82b of the comparator means. The old and new data at inputs 82b/82a, respectively, are compared in means 82 and an output 82c thereof is enabled to a selected logic condition (e.g., a high logic level) if the new data at input 82a has greater amplitude than the old data at input 82b. Output 82c is connected to a substitute-control data input 80d of the image plane memory means, to cause the data stored at the address controlled by input 80a to be changed to accept the new data at input 80b, if the substitute-data control input 80d is at the selected logic level. Thus, the stored data is initially reset, as by a signal through a data/control port 80e (from CPU 74), and the data of greatest value is stored for each image plane pixel location X',Y' responsive to a comparison indicating that the new data exceeds the value of the previously stored old data. After all of the selected addresses are sequentially scanned by address generator 72, the data stored in image plane memory means 80 is scaled in CPU 74, and the scaled image plane data can be withdrawn from memory means 80 for display, permanent storage or similar purposes.

In accordance with a further aspect of the invention, prior to display the scaled image plane data is mapped to achieve a desired brightness and contrast range (step 38 in FIG. 3). In accordance with the preferred embodiment of the invention, the contrast of the projected images is adjusted by the master controller by creating a one-to-one mapping of unadjusted pixel intensity data into adjusted pixel intensity data. Although the mapping can be generated based on the pixel intensity data of either a source frame or a projected image, in the preferred embodiment the mapping is generated using the first (i.e., 0°) projection image data.

Figure 7A:
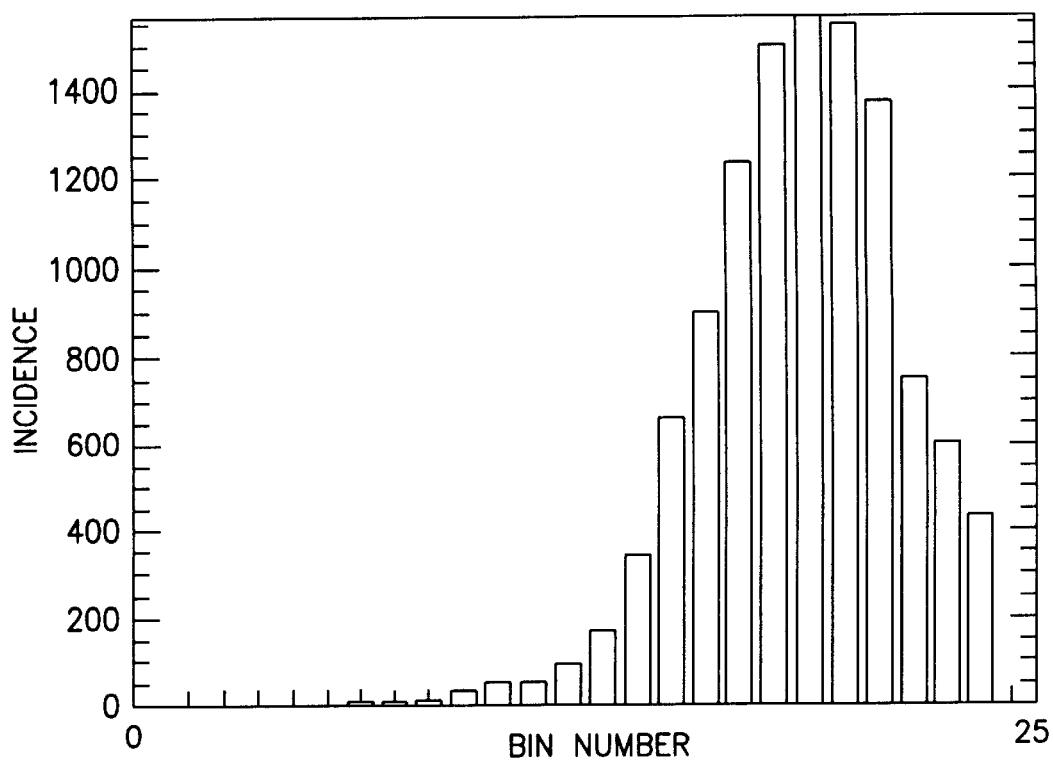
FIG. 7A is a histogram showing the population of pixels having intensity values in predetermined ranges for an image having high-intensity pixels.
Figure 7B:
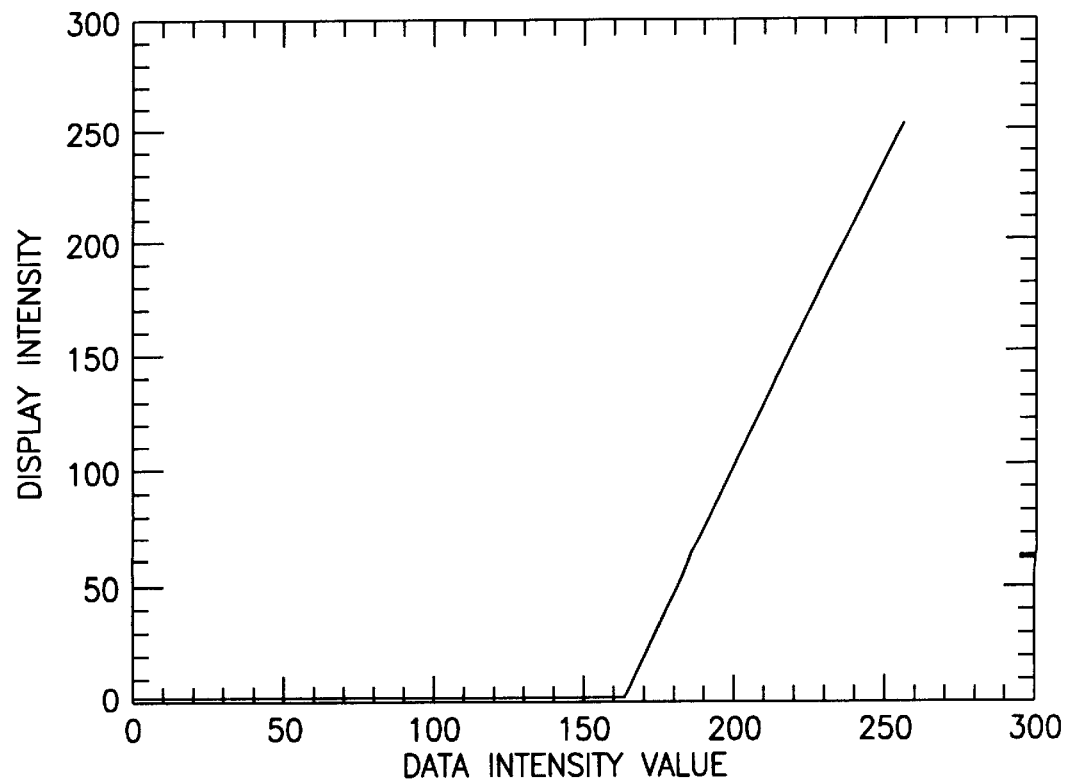
FIG. 7B is a contrast adjustment mapping of the high-intensity pixel data graphed in FIG. 7A in accordance with the preferred embodiment of the invention.
Figure 8A:
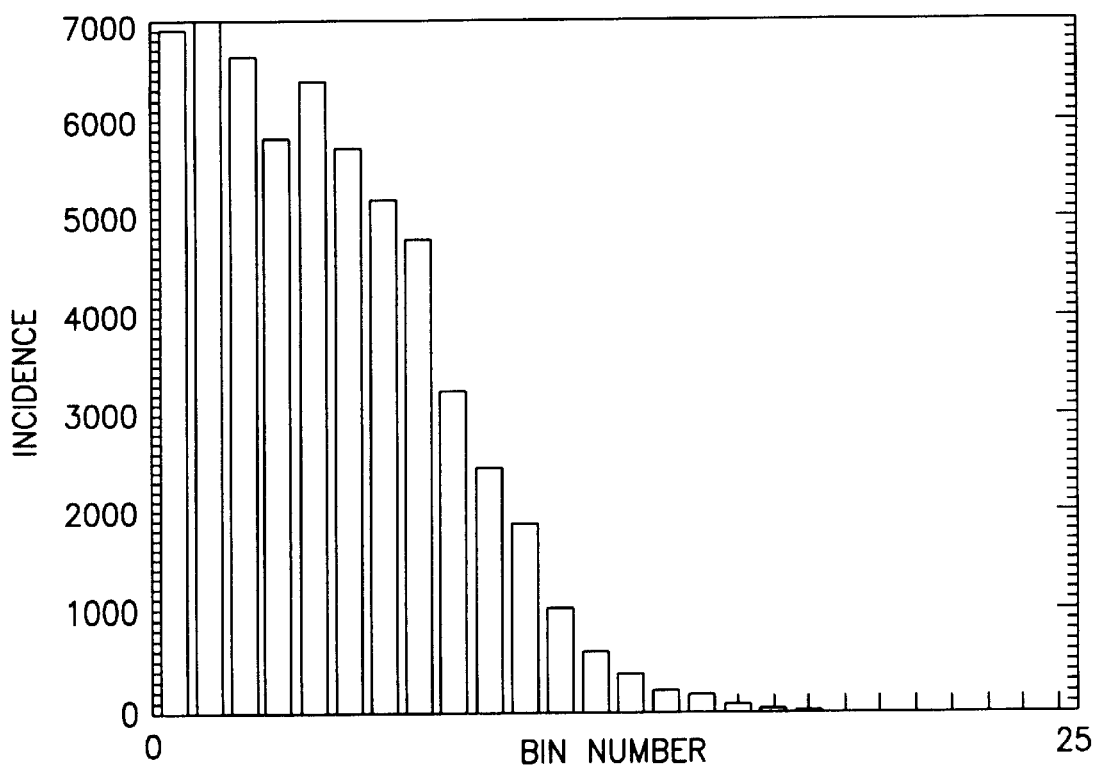
FIG. 8A is a histogram showing the population of pixels having intensity values in predetermined ranges for an image having low-intensity pixels.
Figure 8B:
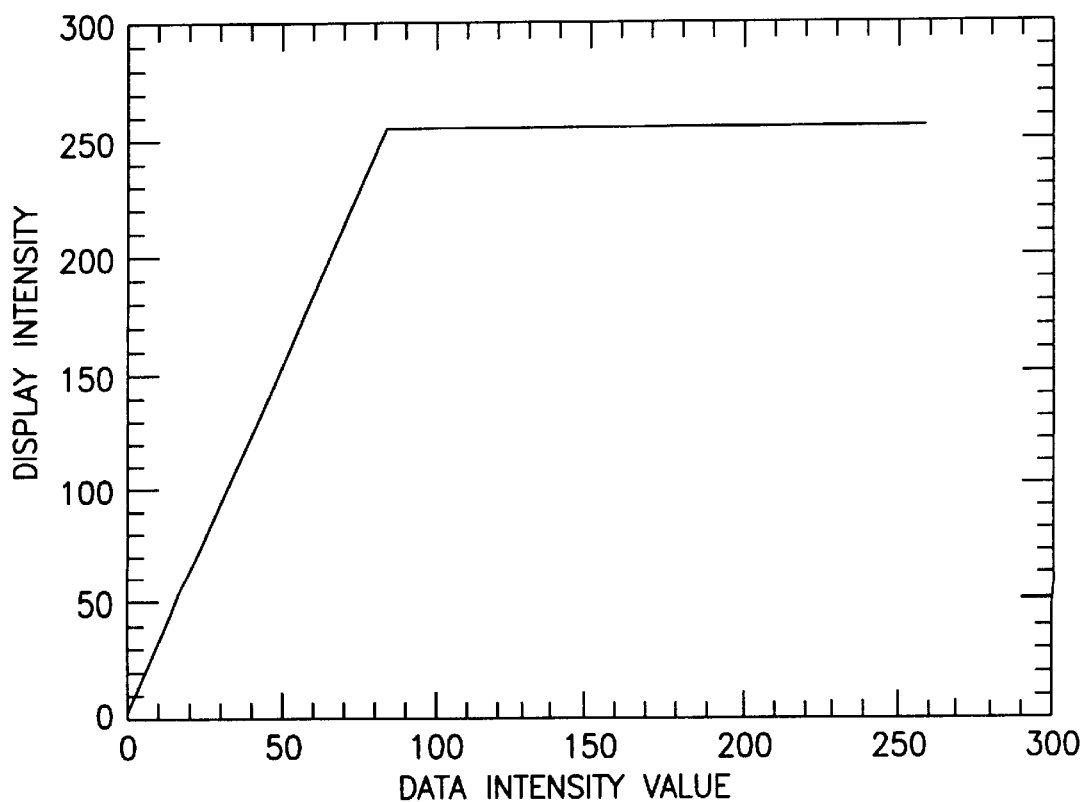
FIG. 8B is a contrast adjustment mapping of the low-intensity pixel data graphed in FIG. 8A in accordance with the preferred embodiment of the invention.

To generate the contrast adjustment mapping, the master controller compiles a histogram of the number of pixels in the projected image having an intensity within each of a multiplicity of prescribed intensity ranges or bins. FIG. 7A shows such a histogram for a projected image having relatively high-intensity pixel data; FIG. 8A shows such a histogram for a projected image having relatively low-intensity pixel data. At the same time, the master controller determines the maximum pixel intensity in the source or projected image. Starting with the bin including the maximum number of pixels and then adding the remaining bins in the order of decreasing number of pixels, the number of pixels in each intensity range or bin are added up until a predetermined percentage of the total number of pixels in the image is reached. When the counted bins include mostly relatively high-intensity pixels (as shown in FIG. 7A), the lower limit of the lowest-intensity bin included in the count becomes the pixel intensity threshold. Conversely, when the counted bins include mostly relatively low-intensity pixels (as shown in FIG. 8A), the upper limit of the highest-intensity bin included in the count becomes the pixel intensity threshold. In each case, a one-to-one mapping is then created such that the range of intensity values above or below the pixel intensity threshold is linearly correlated to an expanded display intensity value range from, e.g., 0 to 255 in the case of 8-bit intensity values. The mapping derived from the histogram of FIG. 7A is depicted in FIG. 7B; the mapping derived from the histogram of FIG. 8A is depicted in FIG. 8B.

In accordance with the method of the invention, the contrast of each projected image is automatically adjusted, using the mapping generated from the pixel intensity histogram, before the master controller writes each projected image into the cine memory. For example, for the high-intensity projected image graphed in FIG. 7A, the projected pixel data having intensity values within the range of about 165 to 250 is mapped or transformed into display intensity values lying in a range of 0 to 255, as shown by the inclined straight line in FIG. 7B. Similarly, for the low-intensity projected image graphed in FIG. 8A, the projected pixel data having intensity values within the range of about 0 to 80 is mapped or transformed into display intensity values lying in a range of 0 to 255, as shown by the inclined straight line in FIG. 8B. It will be appreciated that the input range for the mapping will vary depending on the range of the counted bins in the respective histogram derived from the particular image. The pixel data having intensity values outside the map input range is discarded. By thus increasing the contrast of the pixel intensity data of greatest interest and discarding the pixel intensity data of least interest, the pixel intensity data of each projected image is mapped to the desired brightness and contrast range above or below the pixel threshold. The contrast-adjusted pixel intensity data is then returned to the cine memory for subsequent display.

The projection technique is separately applied to the B-mode intensity data and to the color flow velocity or power data for the data volume of interest retrieved from the cine memory. Each pixel in the projected image includes the transformed intensity data and the transformed velocity or power data derived by projection onto a given image plane. In addition, at the time when the cine memory was frozen by the operator, the CPU 42 optionally stores the last frame from the XY memory 18 at multiple successive addresses in section 24B of cine memory 24. The projected image data for the first projected view angle is written into the first address in cine memory section 24B, so that the projected image data in a region of interest is superimposed on the background frame. This process is repeated for each angular increment until all projected images are stored in cine memory section 24B, each projected image frame consisting of a region of interest containing transformed data and optionally a background perimeter surrounding the region of interest consisting of background frame data not overwritten by region-of-interest transformed data. The background image makes it clearer where each displayed projection is viewed from. The operator can then select any one of the projected images for display. In addition, the sequence of projected images can be replayed on the display monitor to depict the object volume as if it were rotating in front of the viewer.

In accordance with a preferred embodiment of the invention, the ultrasound imaging system has a plurality of different projection modes. For example, the projection may include maximum or minimum value pixels. Alternatively, a mode useful in imaging blood vessels may be selected wherein the pixel data is inverted and then the maximum values are projected onto the image plane. In accordance with a further mode, the ray-casting technique can be employed to provide a surface rendering.

The foregoing preferred embodiments have been disclosed for the purpose of illustration. Variations and modifications of the basic concept of the invention will be readily apparent to those skilled in the arts of ultrasound imaging or computer graphics. All such variations and modifications are intended to be encompassed by the claims set forth hereinafter.

We claim:

1. A system for three-dimensional imaging of an ultrasound scattering medium in an object volume, comprising:

an ultrasound transducer array for transmitting ultrasound beams and detecting ultrasound echoes reflected by a multiplicity of sample volumes in the object volume;

means for acquiring pixel intensity data derived from ultrasound echoes reflected by the scattering medium, each pixel intensity datum corresponding to a respective one of said multiplicity of sample volumes;

memory means for storing acquired pixel intensity data for each of said multiplicity of sample volumes;

means for retrieving a set of pixel intensity data from said memory means corresponding to a volume of interest in the object volume;

means for projecting said pixel intensity data set corresponding to said volume of interest onto an image plane, thereby forming a projected pixel intensity data set representing a projected image;

means for counting the intensity values of said projected pixel intensity data set which lie in a data intensity range;

means for correlating said intensity values which lie in said data intensity range with a display intensity range to create a mapping, the range of values in said display intensity range being different than the range of values in said data intensity range;

means for mapping said intensity values which lie in said data intensity range into corresponding display intensity values from said display intensity range which represent a contrast-adjusted projected image; and a display monitor for displaying said contrast-adjusted projected image.

2. A system for three-dimensional imaging of an ultrasound scattering medium in an object volume, comprising:

an ultrasound transducer array for transmitting ultrasound beams and detecting ultrasound echoes reflected by a multiplicity of sample volumes in the object volume;

means for acquiring pixel intensity data derived from ultrasound echoes reflected by the scattering medium, each pixel intensity datum corresponding to a respective one of said multiplicity of sample volumes;

memory means for storing acquired pixel intensity data for each of said multiplicity of sample volumes;

means for retrieving a set of pixel intensity data from said memory means corresponding to a volume of interest in the object volume;

means for projecting said pixel intensity data set corresponding to said volume of interest onto an image plane, thereby forming a projected pixel intensity data set representing a projected image;

means for transforming said projected pixel intensity data set to represent a contrast-adjusted projected image;

a display monitor; and means for displaying said contrast-adjusted projected image on said display monitor, wherein said transforming means comprise:

means for nulling the intensity values of said projected pixel intensity data set lying in a first intensity range; and means for transforming the intensity values of said projected pixel intensity data set lying in a second intensity range into contrast-adjusted intensity values lying in a third intensity range in accordance with a linear mapping, said first and second intensity ranges being contiguous at a pixel intensity threshold, and said third intensity range being wider than and overlapping said second intensity range, said contrast-adjusted intensity values forming a mapped projected pixel intensity data set representing said contrast-adjusted projected image.

3. The system as defined in claim 2, wherein said second intensity range includes intensity values greater than the intensity values in said first intensity range.

4. The system as defined in claim 2, wherein said second intensity range includes intensity values less than the intensity values in said first intensity range.

5. The system as defined in claim 2, further comprising means for counting the number of pixels in said projected pixel intensity data set having intensity values lying within each of a multiplicity of intensity subranges, said first intensity range including a first set of said multiplicity of intensity subranges and said second intensity range including a second set and excluding said first set of said multiplicity of intensity subranges.

6. The system as defined in claim 5, further comprising:
means for determining said pixel intensity threshold in response to said count equaling a predetermined number; and means for generating said linear mapping as a function of said pixel intensity threshold.

7. The system as defined in claim 2, further comprising means for counting the number of pixels in said pixel intensity data set having intensity values lying within each of a multiplicity of intensity subranges, said first intensity range including a first set of said multiplicity of intensity subranges and said second intensity range including a second set and excluding said first set of said multiplicity of intensity subranges.

8. The system as defined in claim 7, further comprising:
means for determining said pixel intensity threshold in response to said count equaling a predetermined number; and means for generating said linear mapping as a function of said pixel intensity threshold.

9. A method for three-dimensional imaging of an ultrasound scattering medium in an object volume, comprising the following steps:

transmitting ultrasound beams in a scanning plane intersecting the object volume at a multiplicity of sample volumes in said scanning plane;

detecting ultrasound echoes reflected from said multiplicity of sample volumes in said scanning plane;

scanning said scanning plane through the object volume;

acquiring pixel intensity data derived from ultrasound echoes reflected by the scattering medium, each pixel intensity datum corresponding to a respective one of said multiplicity of sample volumes;

storing acquired pixel intensity data for each of said multiplicity of sample volumes;

retrieving a set of pixel intensity data from said stored acquired pixel intensity data, said pixel intensity data set corresponding to a volume of interest in the object volume;

projecting said pixel intensity data set onto an image plane, thereby forming a projected pixel intensity data set representing a projected image;

counting the intensity values of said projected pixel intensity data set which lie in a data intensity range;

correlating said intensity values which lie in said data intensity range with a display intensity range to create a mapping, the range of values in said display intensity range being different than the range of values in said data intensity range;

mapping said intensity values which lie in said data intensity range into corresponding display intensity values from said display intensity range which represent a contrast-adjusted projected image; and displaying said contrast-adjusted projected image.

10. Method for three-dimensional imaging of an ultrasound scattering medium in an object volume, comprising the following steps:

transmitting ultrasound beams in a scanning plane intersecting the object volume at a multiplicity of sample volumes in said scanning plane;

detecting ultrasound echoes reflected from said multiplicity of sample volumes in said scanning plane;

scanning said scanning plane through the object volume;

acquiring pixel intensity data derived from ultrasound echoes reflected by the scattering medium, each pixel intensity datum corresponding to a respective one of said multiplicity of sample volumes;

storing acquired pixel intensity data for each of said multiplicity of sample volumes;

retrieving a set of pixel intensity data from said stored acquired pixel intensity data, said pixel intensity data set corresponding to a volume of interest in the object volume;

projecting said pixel intensity data set onto an image plane, thereby forming a projected pixel intensity data set representing a projected image;

transforming said projected pixel intensity data set to represent a contrast-adjusted projected image; and displaying said contrast-adjusted projected image, wherein said transforming step comprises the steps of:
nulling the intensity values of said projected pixel intensity data set lying in a first intensity range; and
transforming the intensity values of said projected pixel intensity data set lying in a second intensity range into contrast-adjusted intensity values lying in a third intensity range in accordance with a linear mapping, said first and second intensity ranges being contiguous at a pixel intensity threshold, and said third intensity range being wider than and overlapping said second intensity range, said contrast-adjusted intensity values forming a mapped projected pixel intensity data set representing said contrast-adjusted projected image.

11. The method as defined in claim 10, wherein said second intensity range includes intensity values greater than the intensity values in said first intensity range.

12. The method as defined in claim 10, wherein said second intensity range includes intensity values less than the intensity values in said first intensity range.

13. The method as defined in claim 10, further comprising the step of counting the number of pixels in said projected pixel intensity data set having intensity values lying within each of a multiplicity of intensity subranges, said first intensity range including a first set of said multiplicity of intensity subranges and said second intensity range including a second set and excluding said first set of said multiplicity of intensity subranges.

14. The method as defined in claim 13, further comprising the steps of:
determining said pixel intensity threshold in response to said count equaling a predetermined number; and
generating said linear mapping as a function of said pixel intensity threshold.

15. The method as defined in claim 10, further comprising the step of counting the number of pixels in said pixel intensity data set having intensity values lying within each of a multiplicity of intensity subranges, said first intensity range including a first set of said multiplicity of intensity subranges and said second intensity range including a second set and excluding said first set of said multiplicity of intensity subranges.

16. The method as defined in claim 15, further comprising the steps of:
determining said pixel intensity threshold in response to said count equaling a predetermined number; and
generating said linear mapping as a function of said pixel intensity threshold.

17. A method for three-dimensional imaging of an ultrasound scattering medium in an object volume, comprising the following steps:
transmitting ultrasound beams in a scanning plane intersecting the object volume at a multiplicity of sample volumes in said scanning plane;
detecting ultrasound echoes reflected from said multiplicity of sample volumes in said scanning plane;
scanning said scanning plane through the object volume at a multiplicity of scanning positions;
acquiring a multiplicity of subsets of pixel intensity data derived from ultrasound echoes reflected by the scattering medium in respective planes defined by the scanning positions of said scanning plane, each subset of pixel intensity data forming a respective intensity data frame;
storing said multiplicity of intensity data frames;
retrieving a respective subset of pixel intensity data corresponding to a region of interest from selected successive stored intensity data frames, said pixel intensity data subsets forming a pixel intensity data set corresponding to a volume of interest in the object volume;
projecting said pixel intensity data set onto an image plane, thereby forming a projected pixel intensity data set representing a projected image;
counting the intensity values of said projected pixel intensity data set which lie in a data intensity range;
correlating said intensity values which lie in said data intensity range with a display intensity range to create a mapping, the range of values in said display intensity range being different than the range of values in said data intensity range;
mapping said intensity values which lie in said data intensity range into corresponding display intensity values from said display intensity range which represent a contrast-adjusted projected image; and
displaying an image comprising said contrast-adjusted projected image superimposed on a central region of a selected one of said multiplicity of intensity data frames.

18. A method for three-dimensional imaging of an ultrasound scattering medium in an object volume, comprising the following steps:
transmitting ultrasound beams in a scanning plane intersecting the object volume at a multiplicity of sample volumes in said scanning plane;
detecting ultrasound echoes reflected from said multiplicity of sample volumes in said scanning plane;
scanning said scanning plane through the object volume at a multiplicity of scanning positions;
acquiring a multiplicity of subsets of pixel intensity data derived from ultrasound echoes reflected by the scattering medium in respective planes defined by the scanning positions of said scanning plane, each subset of pixel intensity data forming a respective intensity data frame;
storing said multiplicity of intensity data frames;
retrieving a respective subset of pixel intensity data corresponding to a region of interest from selected successive stored intensity data frames, said pixel intensity data subsets forming a pixel intensity data set corresponding to a volume of interest in the object volume;
projecting said pixel intensity data set onto an image plane, thereby forming a projected pixel intensity data set representing a projected image;
transforming said projected pixel intensity data set to represent a contrast-adjusted projected image; and
displaying an image comprising said contrast-adjusted projected image superimposed on a central region of a selected one of said multiplicity of intensity data frames, wherein said transforming step comprises the steps of:
nulling the intensity values of said projected pixel intensity data set lying in a first intensity range; and
transforming the intensity values of said projected pixel intensity data set lying in a second intensity range into contrast-adjusted intensity values lying in a third intensity range in accordance with a linear mapping, said first and second intensity ranges being contiguous at a pixel intensity threshold, and said third intensity range being wider than and overlapping said second intensity range, said contrast-adjusted intensity values forming a mapped projected pixel intensity data set representing said contrast-adjusted projected image.

19. The method as defined in claim 18, further comprising the step of counting the number of pixels in said projected pixel intensity data set having intensity values lying within each of a multiplicity of intensity subranges, said first intensity range including a first set of said multiplicity of intensity subranges and said second intensity range including a second set and excluding said first set of said multiplicity of intensity subranges.

20. The method as defined in claim 19, further comprising the steps of:
determining said pixel intensity threshold in response to said count equaling a predetermined number; and
generating said linear mapping as a function of said pixel intensity threshold.

* * * * *